E. N. MROZINSKI & C. L. HUNSICKER.
MACHINE FOR MAKING AND INSERTING PAPER RINGS IN CAN HEADS.
APPLICATION FILED MAY 28, 1913.
1,087,040.
Patented Feb. 10, 1914.
8 SHEETS—SHEET 5.
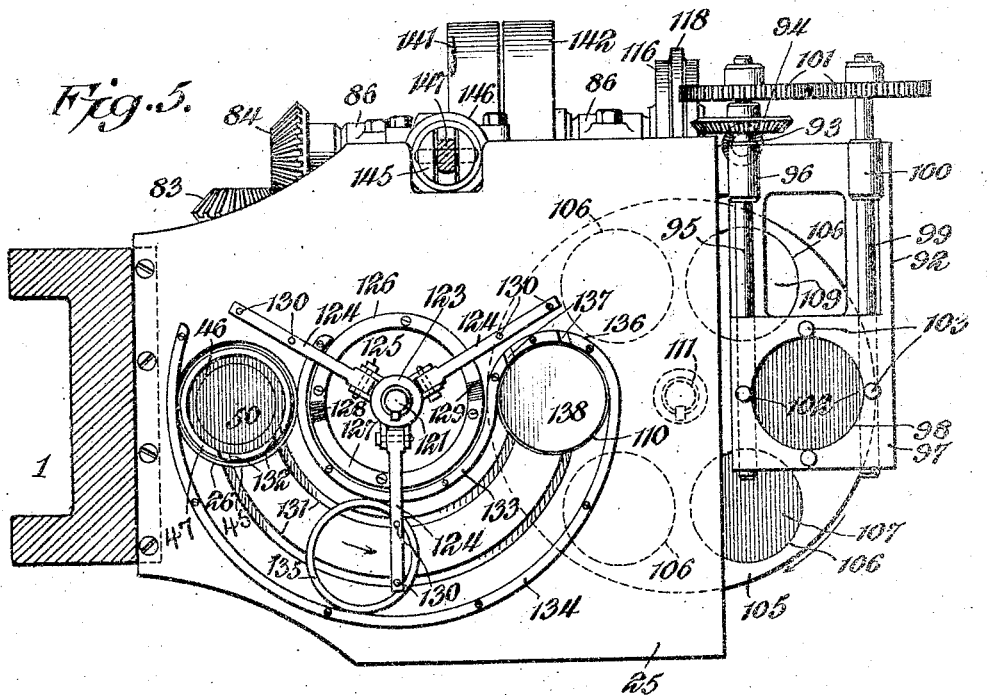
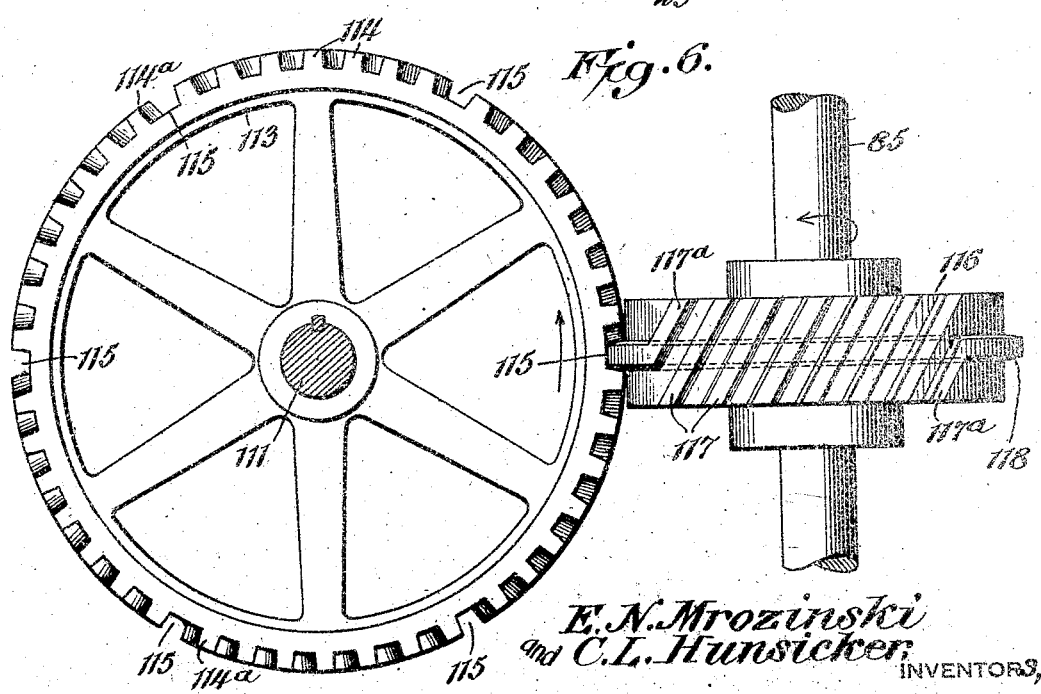

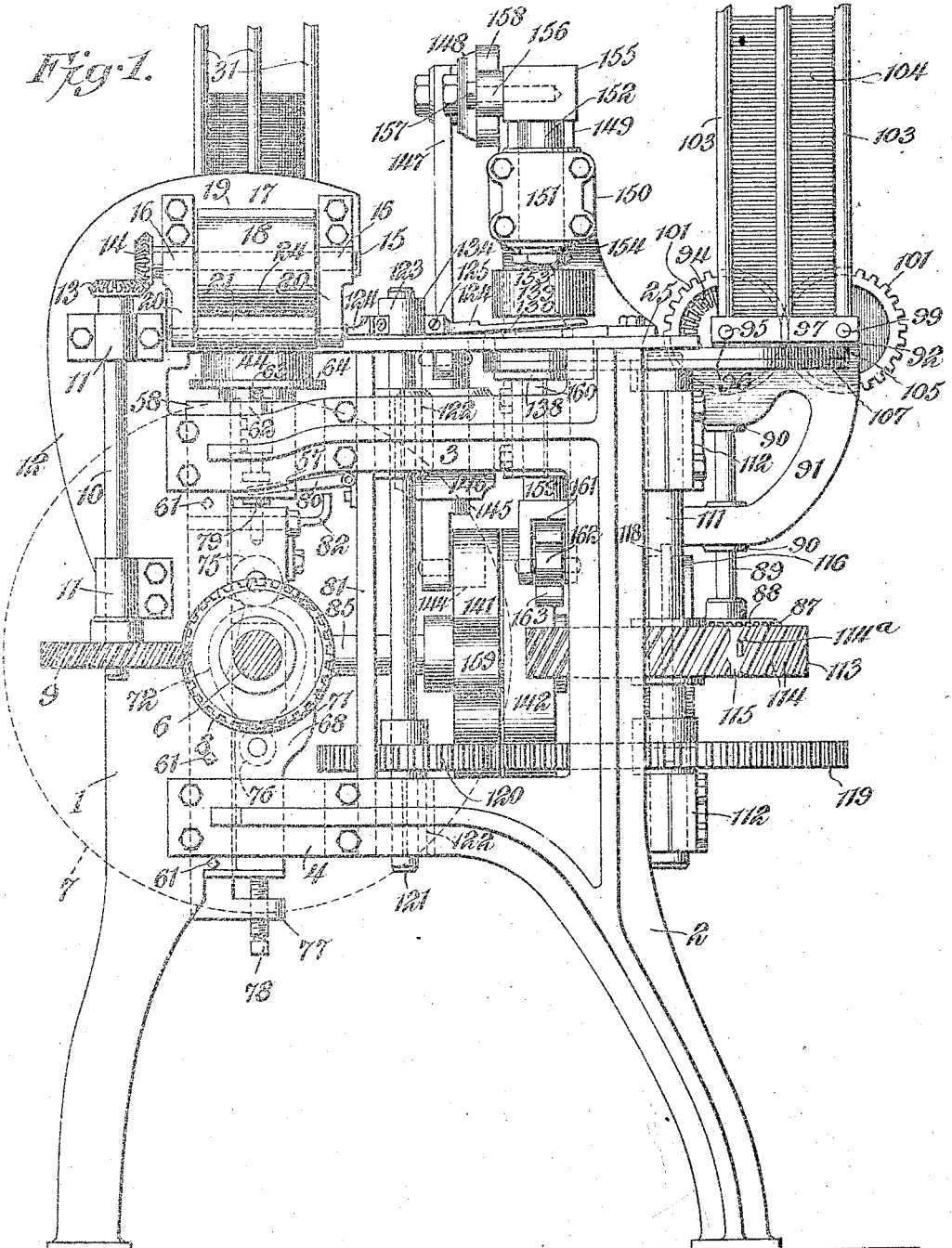

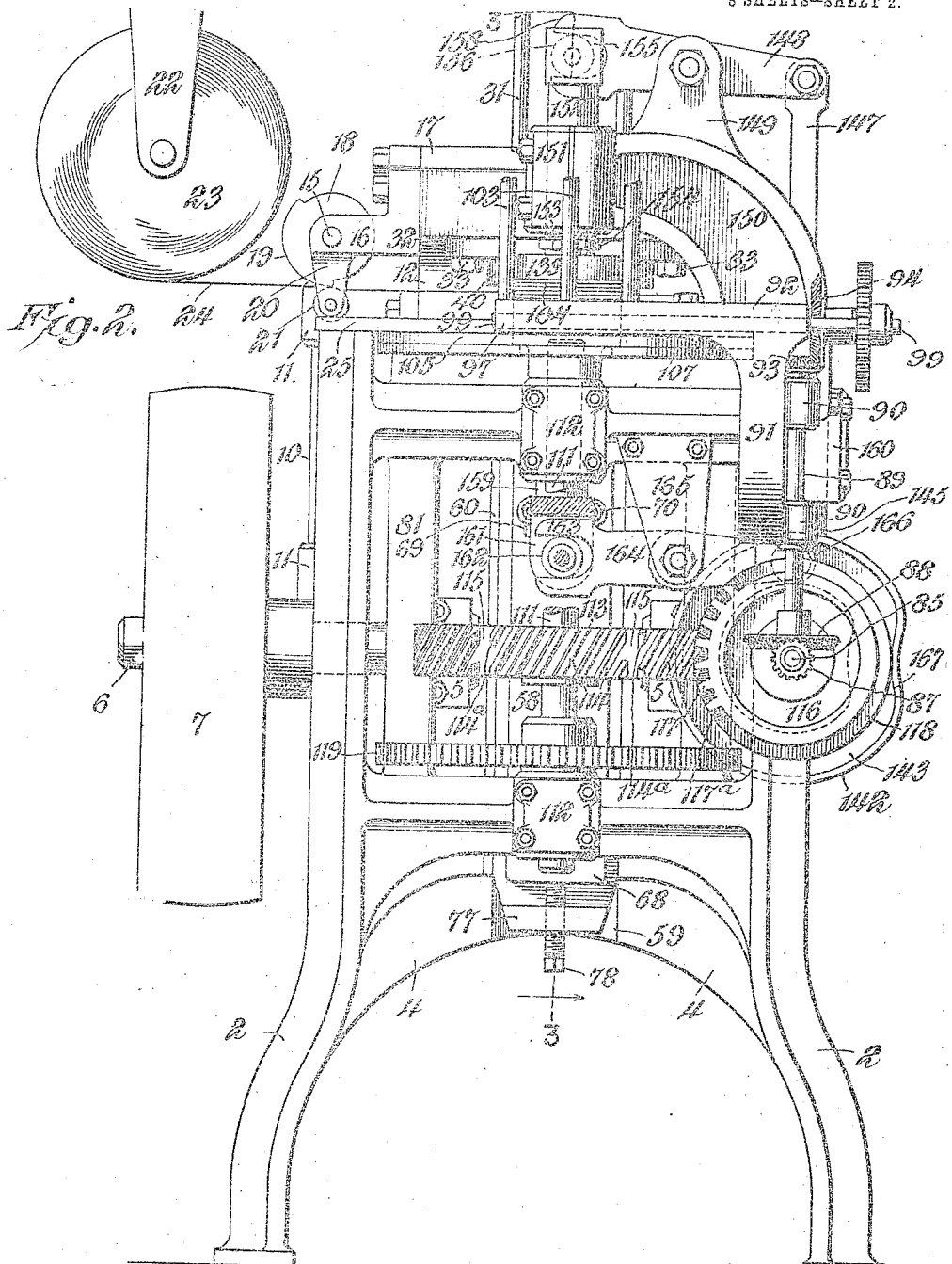

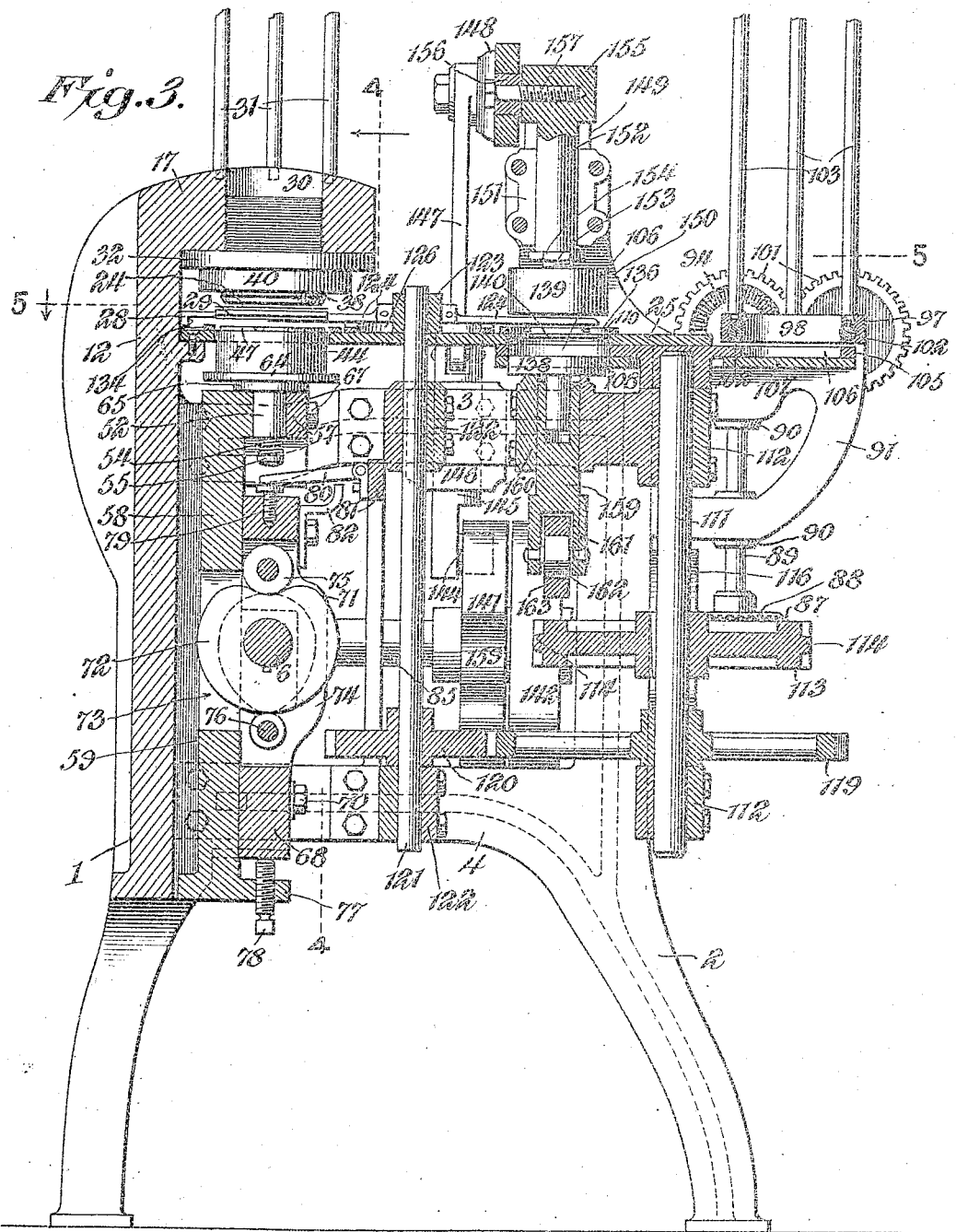

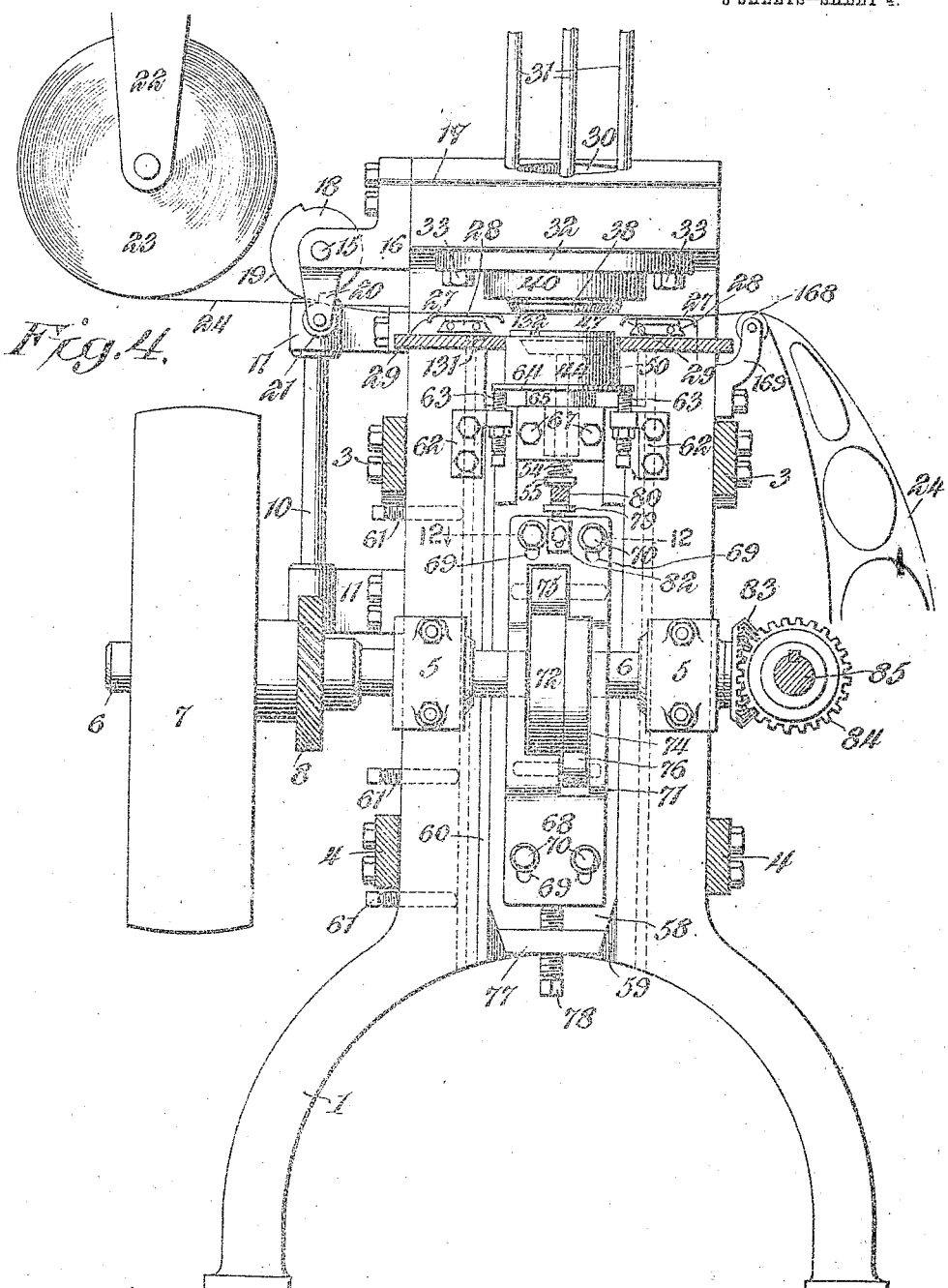

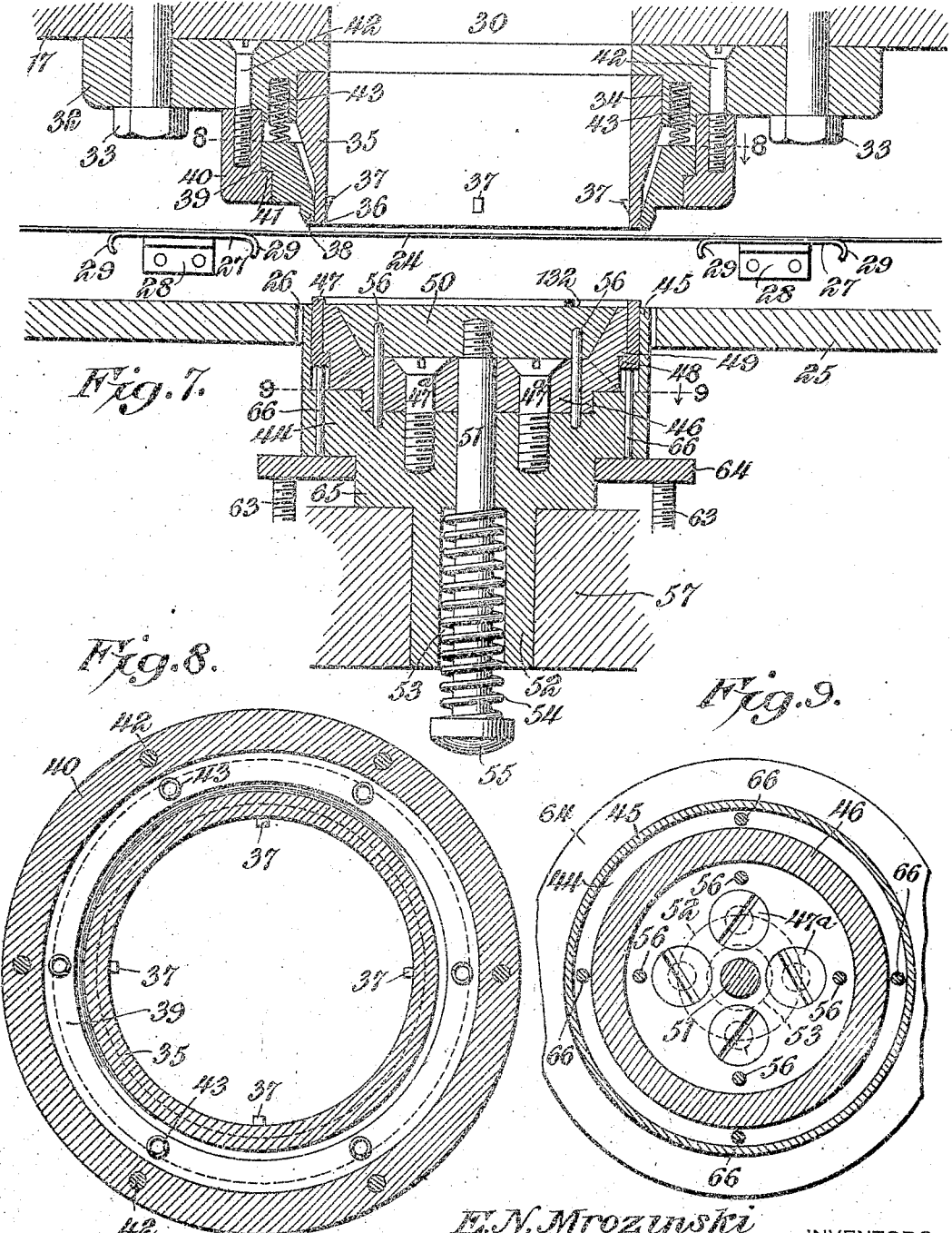

E. N. MROZINSKI & C. L. HUNSICKER.
MACHINE FOR MAKING AND INSERTING PAPER RINGS IN CAN HEADS.
APPLICATION FILED MAY 28, 1913.
1,087,040.
Patented Feb. 10, 1914.
8 SHEETS—SHEET 7.
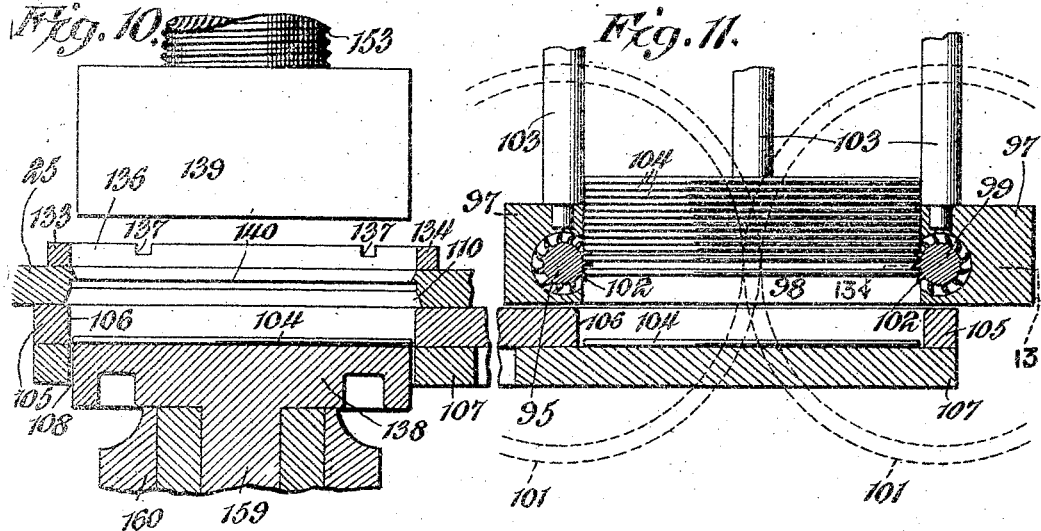
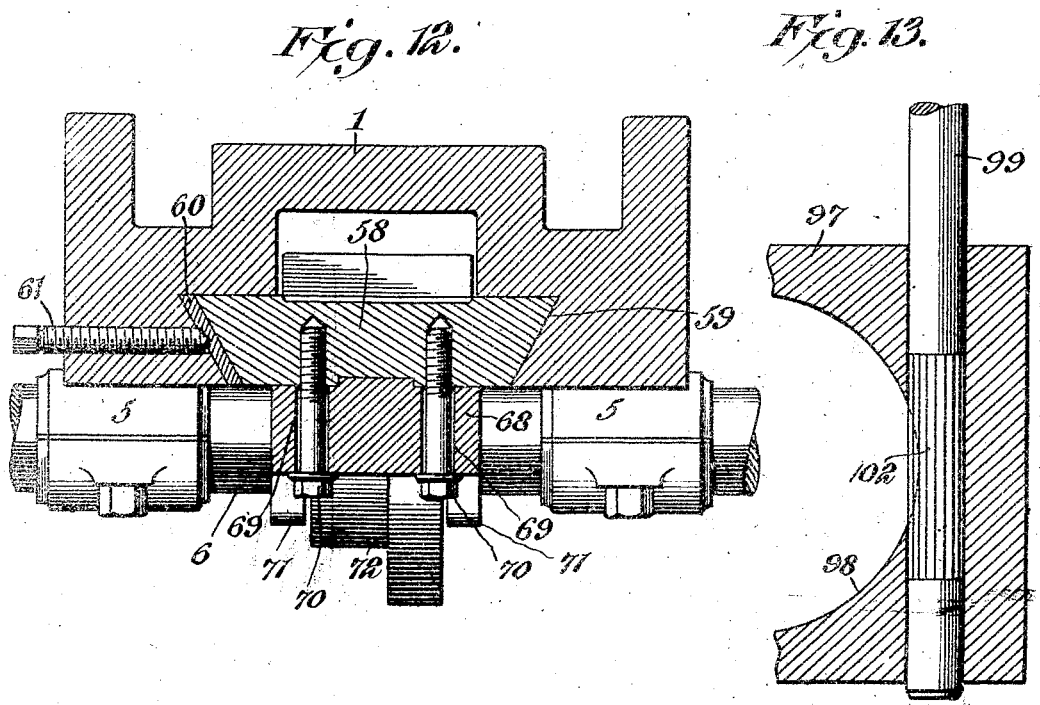

E. N. MROZINSKI & C. L. HUNSICKER.
MACHINE FOR MAKING AND INSERTING PAPER RINGS IN CAN HEADS.
APPLICATION FILED MAY 28, 1913.
1,087,040.
Patented Feb. 10, 1914.
8 SHEETS—SHEET 6.
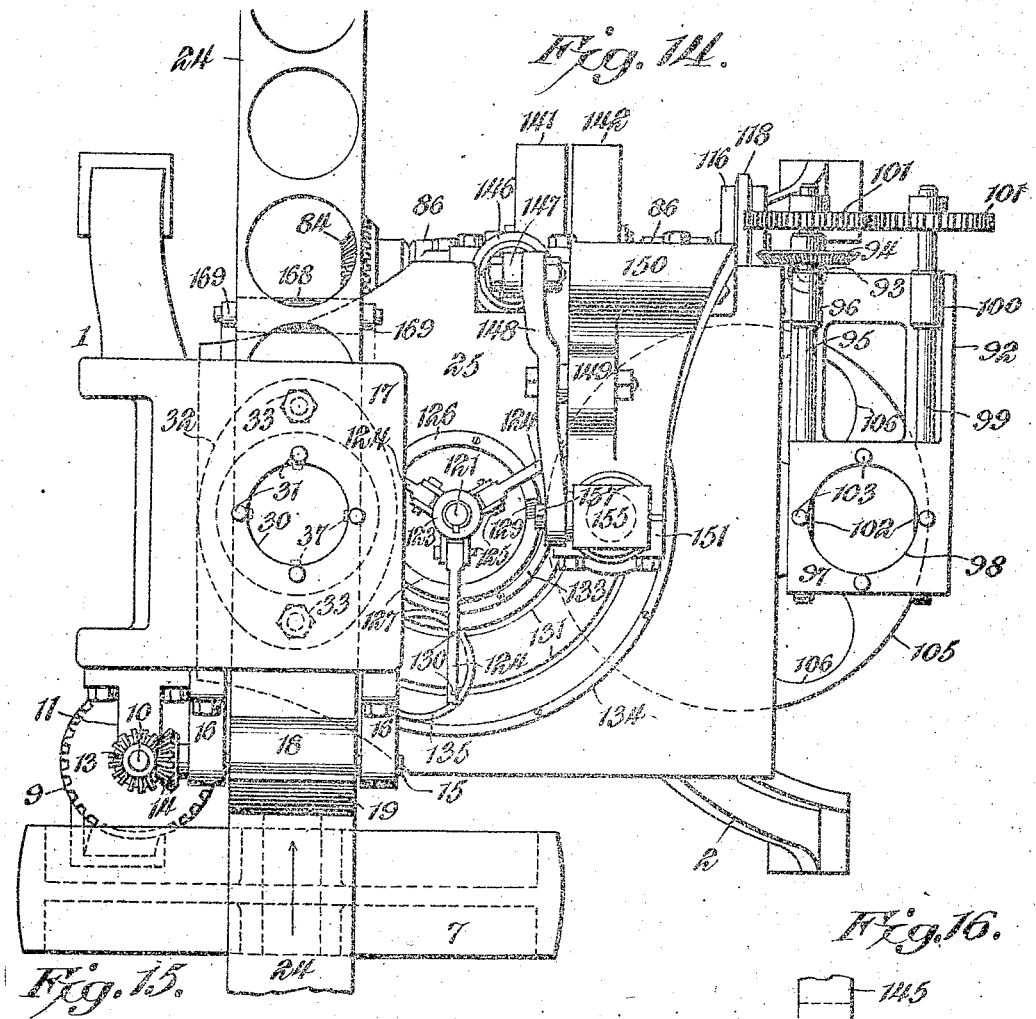
WITNESSES
Howard D. Orr
F. T. Chapman
E. N. Mrozinski
and C. L. Hunsicker, INVENTORS
BY
ATTORNEY

UNITED STATES PATENT OFFICE.

EDWARD N. MROZINSKI AND CLYDE L. HUNSICKER, OF SAN FRANCISCO, CALIFORNIA.

MACHINE FOR MAKING AND INSERTING PAPER RINGS IN CAN-HEADS.

1,087,040.  Specification of Letters Patent.  Patented Feb. 10, 1914.

Application filed May 22, 1913. Serial No. 770,428.

*To all whom it may concern:*

Be it known that we, EDWARD N. MROZINSKI and CLYDE L. HUNSICKER, citizens of the United States, residing at San Francisco, in the county of San Francisco and State of California, have invented a new and useful Machine for Making and Inserting Paper Rings in Can-Heads, of which the following is a specification.

This invention has reference to improvements in machines for making and inserting paper rings in can heads, and its object is to provide a machine which will cut out rings from a continuous web of paper and deposit these rings in a peripheral groove or channel in the can heads, it being understood that the term paper is to be interpreted broadly enough to cover other materials suitable for the purpose.

Certain types of metal cans or containers are provided with packing rings or gaskets, which may be of paper or other suitable material, between the ends of the can body and the heads of the can, which heads have their edges subsequently forced into contact with the ends of the can body, so as to lock thereto, the gasket serving as a sealing means replacing solder and thereby avoiding any liability of contamination of the contents of the can which might occur were solder employed as the sealing agent.

In accordance with the present invention mechanism is provided whereby an elongated web of paper conveniently in the form of a roll, is intermittently fed through the machine and during the periods of rest is acted upon by a punching mechanism in a manner to cut rings of paper therefrom of appropriate size, the remainder of the web passing out of the machine, and the portions of the web interior to the cut out rings also being discarded. As soon as the rings are formed and separated from the web they are carried by suitable mechanism into overriding relation to can heads which are moved to the proper point one at a time, and the rings are then deposited in the marginal grooves of the can heads, which grooved can heads are previously formed by mechanism constituting no part of this invention, and the can heads with the rings lodged therein are finally discharged from the machine to move to or fall into a suitable receptacle.

Besides the general arrangement just described the invention comprises various mechanisms by means of which the operations stated are performed.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings but may be changed and modified so long as such changes and modifications mark no material departure from the salient features of the invention.

In the drawings:—Figure 1 is an elevation of the machine from the paper feed side thereof, the drive shaft being in cross section. Fig. 2 is an elevation of the machine as viewed from the right hand side of Fig. 1. Fig. 3 is a section on the line 3—3 of Fig. 2. Fig. 4 is a section on the line 4—4 of Fig. 3. Fig. 5 is a section on the line 5—5 of Fig. 3, some distant parts being omitted. Fig. 6 is a detail elevation of a portion of intermittent gearing employed in the machine. Fig. 7 is a vertical section through the paper ring punching mechanism drawn to a larger scale than the other figures. Fig. 8 is a detail section on the line 8—8 of Fig. 7. Fig. 9 is a detail section on the line 9—9 of Fig. 7. Fig. 10 is a detail section of a part of the turret and ring seating plunger. Fig. 11 is a section on the same scale as Fig. 10 but taken through another part of the turret. Fig. 12 is a detail section on the line 12—12 of Fig. 4. Fig. 13 is a section on the line 13—13 of Fig. 11. Fig. 14 is a plan view of the machine. Figs. 15 and 16 are elevations of two cams employed in the machine.

Referring to the drawings, there is shown a frame made up of two general members 1, 2, the frame member 2 having arms or extensions 3, 4 projecting from one face, and at the ends connected to the member 1 and spacing the members apart an appropriate distance to accommodate various structures to be described. In place of the particular construction of the frame shown any suitable frame construction or support may be employed. The frame member 1 carries journal bearings 5 for a main shaft 6 which on one end beyond the frame is provided with a pulley 7 for the application of power as by a belt, but this pulley 7 may be taken as indicative of any appropriate means for the application of power to the drive shaft.

Mounetd on the drive shaft 6 near the pulley 7 is a worm wheel 8 in mesh with another worm wheel 9 on an upright shaft 10 mounted in journal bearings 11 on an arm 12 which may constitute a part of the frame member 1. The shaft 10 rises to an appropriate height and there carries a bevel pinion 13 meshing with another bevel pinion 14 carried by one end of a shaft 15 mounted in bearings 16 fast to the arm 12 at the upper end thereof, which upper end, indicated at 17, is disposed in overhanging relation to the shaft 6 and carries certain mechanisms to be described. The shaft 15 has mounted thereon between the bearings 16 a feed roller 18 having a portion of its periphery of reduced diameter, so that there is left an active segment 19 of appropriate circumferential extent. The bearings 16 are in upstanding relation to the overhang 17 of the arm 12, and depending from these bearings 16 are hangers 20 carrying an idler roller 21 in underriding relation and close to the feed roller 18.

At a point adjacent to the feed roller 18 are supports 22 either on the machine or otherwise disposed, and these supports are designed to carry a roll 23 of paper in the form of a web 24, which web may be of relatively great length and is sufficiently wide to permit cutting rings therefrom of appropriate diameter for the present invention. The web 24 is usually of paper, but the machine of the present invention is not necessarily limited to the use of a web of paper, wherefore the term paper is used in this specification without limiting the invention to the sole use of paper, for any appropriate material may be employed.

The paper employed is sufficiently stiff to permit its being fed through the machine by the feed roller 18 clamping the paper between the active segment 19 and the idler roller 21, and while so engaged and the roller 18 is rotating, the paper is pushed forwardly through the machine to an extent corresponding to the circumferential length of the segment 19. The shaft 6 is assumed to be rotating continuously, and, therefore, the feed roller 18 being at all times positively connected with the shaft through the intermediate gearing described, is also continuously rotating, but is active to feed the web 24 for only a fractional portion of a complete rotation, and is inactive to the paper web during the remainder of such rotation. It follows, therefore, that the paper is intermittently fed through the machine and by a proper proportioning of the parts this intermittent feed is timed to permit other operations to be described.

Mounted on the frame made up of the members 1 and 2, at the upper end of these members, is a table 25, one portion thereof underriding the overhanging portion 17 of the arm 12. This table is provided at an appropriate point in underriding relation to the web 24 in its travel through the machine, with a passage 26, and the web 24 is supported at an appropriate distance above the table by plates 27 on opposite sides of the passage 26, said plates being carried by brackets 28 on the inner face of the arm 12. To prevent any catching of the paper web, the plates 27 may have their edges downturned as indicated at 29. The overhang 17 has a passage 30 therethrough in line with the passage 26 and at the upper end of this passage there is provided a cage formed of an appropriate number of rods 31 in circular series, and of an internal diameter as great as the diameter of the passage 30.

Fast to the under face of the overhang 17 is a ring 32 having its internal diameter equal to the diameter of the passage 30 and alined therewith, this ring being held to the overhang by bolts or screws 33 or in any other appropriate manner. The ring 32 has on the edge remote from the overhang 17 and about its central passage a groove or rabbet 34 in which is seated one end of a cylindrical cutting die 35 with its active end downward. That end of the die seated in the groove 34 may be of greater external diameter than the remainder of the die, but the active end, indicated at 36, is of a thickness corresponding to the thickness of the paper ring to be produced. Within the die 35 near the active end are teeth or catches 37 tapering toward the active end of the die until they merge into the inner wall of the die, while the upper ends are shouldered. These catches serve a purpose to be described. Surrounding the die 35 is a stripping ring 38 snugly fitting the exterior of the die at its active end. The stripping ring 38 has an exterior shouldered portion 39 normally engaged by a retainer ring 40 having an internal flange 41 engaging the shouldered portion 39 of the stripping ring 38. The retaining ring 40 is held to the ring 32 by screws 42 or in any other appropriate manner, while spring 43 seated in pockets in the ring 32 between the die 35 and the retaining ring 40 bear against the stripper ring 38 and tend to hold it in engagement with the flange 41, in which position the lower or active end of the stripper is about coincident with the active or lower end 36 of the die 35. There is provided another die 44 having a cylindrical active end 45 of an internal diameter such as to snugly receive the active end 36 of the male die 35.

The active or cutting end 45 of the die 44 is sufficiently elongated axially to form a pocket in which is seated a block 46 held to the body of the die by screws 47ª or otherwise, and this block extends to the upper edge of the active end 45 of the die, but its peripheral portion is spaced from the inner wall of the active end 45 by a distance about equal to the thickness of the active end of the male die 35. In the space so provided there is lodged a knock-out ring 47 having at one end an inturned flange 48 in position to engage a shoulder 49 on the block 46 permitting the knock-out ring to project beyond the active end 45 of the die 44 for a short distance, say one thirty-second of an inch more or less. The block 46 is formed with a tapering recess forming a seat for the reception of a pad 50 having an external diameter such as to permit the pad to move into the male die 35 and past the catches or lugs 37. The pad 50, which may be of metal, is carried by one end of a rod 51 extending axially through the body of the die 44 and through the block 46 and through the shank continuation 52 of the die 44, the said shank continuation having an axial counterbore 53, in which is lodged a spring 54 surrounding the rod 51, which latter beyond the shank 52 is formed or provided with a head 55 against which one end of the spring 54 bears, the other end of the spring bearing against the terminal wall of the counterbore 53. The tendency of the spring 54 is to maintain the pad 50 seated in the block 46, but when a force is brought to bear upon the head 55 sufficient to compress the spring 54 the pad will move out of its seat in the block 46. The pad 50 is guided in its movements with the rod 51 by pins 56 extending and movable through the block 46 and into the die 44 for an appropriate distance, and also movable into and out of said die.

The shank 52 of the die 44 is seated in a laterally projecting arm 57 on the upper end of a slide 58 mounted in a dovetail channel 59 in an appropriate portion of the frame member 1, the slide 58 being provided with a wear gib 60 adjustable by means of set screws 61 tapped through appropriate portions of the frame member 1. On opposite sides of the slide 58 are brackets 62 made fast to the frame 1 and each carrying a set screw 63 in the path of a ring 64 surrounding the die 44 at a reduced portion 65 thereof, this reduced portion being intermediate of the shank 52 and the main body of the die 44. Traversing the main body of the die 44 in substantial parallelism with the rod 51 are pins 66 so disposed as to each engage at one end the ring 64 and at the other end engage the knock-out ring 47.

By mechanism to be described the slide 58, together with the die 44 carried thereby, being held thereto by a set screw 67 engaging the shank 52, is raised and lowered through the passage 26. The extent of movement of the die 44 is sufficient to carry the active end 45 into engagement with the stripping ring 38 and then along the male die 35, moving the stripping ring with it and at the same time compressing the springs 43. Now considering that the strip of paper 24 is between the two dies and is at the time of consideration at rest, the edge 45 of the die 44 shears a disk out of the web and at the same time the block 46 shears a smaller disk from the first-named disk cut from the web 24. As the die rises it moves away from the ring 64 and the knock-out ring 47 drops with relation to the die, or if it does not so drop it is readily pushed into the space between the inner wall of the active end 45 of the die 44 and the adjacent outer wall of the block 46, this outer wall of the block also serving as a shearing or cutting member in coaction with the inner wall of the die 35, so that the active end 45 of the die 44 and the corresponding portion of the block 46 together form an annular cutter or die. This leaves a disk of paper inside the die 44 and by mechanism to be described the pad 50 is now forced beyond the limit of active travel of the die 44 for a sufficient distance to lift the disk of paper cut out from the interior of the ring above the upper edges of the catches 37, the paper readily yielding to the catches and snapping back over the top thereof so that when the parts are lowered the paper disk remains on the catches 37 while the ring is carried downwardly away from the path of the web 24 by its lodgment in the space between the members 45 and 46 of the annular die. The downward movement of the die 44 continues until the upper edge of the die is about coincident with the top of the table 25, but just before its lower limit of travel is reached the screws 63 come into engagement with the ring 64 and further downward movement of the ring is stopped, wherefore the pins 66 are held against the lowering movement and engage the knock-out ring 47 so that its movement is arrested before the lower limit of travel of the die is reached and the upper edge of the knock-out ring is projected through the top of the die, thereby lifting the paper ring from the die and said paper ring and the upper edge of the knock-out ring slightly above the top of the table 25.

When the paper ring is cut from the web 24, the latter is lifted up on the die 35 and would be liable to remain there when the movable or lower die is retracted, but this is prevented by the stripping ring 38 which follows up the retracting lower die because of the expansion of the springs 43 and so strips the web from the die 35, whereupon the web is free to travel under the action of the feeding roller 18.

Fast to the slide 58 on the side thereof remote from the frame member 1 is a rider in the form of an elongated plate 68 with longitudinal slots 69 near the ends traversed by set screws 70 entering the slide 58, so that the rider may be adjusted lengthwise of the slide for a short distance. The shaft 6 extends across the slide in close relation thereto and the rider is bowed outwardly, as indicated at 71, to permit the passage of the shaft 6 without interference with the rider. On the shaft 6 there is secured a cam 72, while the slide is recessed or slotted, as indicated at 73, and the rider is also slotted, as indicated at 74, to accommodate the cam. Journaled in the slot 74 of the rider are rollers 75, 76 on diametrically opposite sides of the shaft 6 and cam 72, so that when the shaft 6 is rotated the cam 72 engages the two rollers 75 and 76 on opposite sides of the cam and therefore urges the rider and with it the slide in opposite directions at such relative speeds with intermediate periods of rest as may be determined by the shape of the cam, while the extent of travel of the slide depends upon the size of the cam, the parts being so proportioned that the die carried by the slide is moved actively, while the paper web 24 is at rest and returns to the low position and there remains quiescent while the paper web 24 is being actuated.

At the bottom of the slide 58 there is a lip 77 carrying a set screw 78 bearing against the bottom of a rider 68 so that this rider may be delicately adjusted with respect to the slide and then secured in the adjusted position by the screws 70. At the upper end of the rider there is another set screw 79 which may serve as a support for the free end of an arm 80 extending over the upper end of the rider 68, and at the other end pivoted to a fixed portion 81 of the main frame. Fast to the rider is a finger 82 so disposed as to have the arm 80 in its path and arranged to actuate the arm 80 when the slide carrying the rider is elevated. By positioning the finger 82 so as to be relatively close to the pivot support of the arm 80, the free end of the latter may be made to travel for a greater distance than the slide and parts carried thereby, and it is the function of this arm 80 to engage the head 55 of the pin 51 and lift the pad 50 as the disk inside the ring cut by the dies is severed from the ring, so that the pad may elevate the cut disk into engaging relation with the catches 37.

As the waste disks are lifted by the pad 50 they accumulate in the die 35 and in the passage 30 of the overhang 17 and ultimately reach the cage 31 from whence they may be moved by an attendant from time to time.

In addition to means for producing paper rings from a web of paper the machine of the present invention provides means for moving the paper rings from the cutters or dies into position to be deposited upon can heads, the machine providing means for feeding the heads to a part of the machine where the paper rings may be deposited upon the heads and seated therein. To provide for the various movements, the can heads being fed one at a time from a reservoir to the ring receiving position and the rings being moved from the position where they are cut to the place where they are deposited upon the can heads, all in timed relation, there is mechanism acting upon the ring carrying and can head carrying or actuating devices which will now be described and which all receive motion from the main drive shaft 6 through suitable gearing, shafting and other driving devices.

At that end of the shaft 6 remote from the pulley 7 and on the other side of the frame 1 from the pulley 7 is a miter gear wheel 83 meshing with another miter gear wheel 84 on a shaft 85 mounted in bearings 86 on the main frame. The shaft 85 is perpendicular to the shaft 6 and at the end remote from the gear wheel or pinion 84 it carries another bevel pinion 87, this pinion being on the side of the machine remote from the shaft 6. The pinion 87 is in mesh with another bevel pinion 88 on the lower end of an upright shaft 89 having journal bearings 90 in a bracket 91 depending from a frame 92 and attached to the main frame, the frame 92 being supported by the bracket 91. At the upper end of the shaft 89 is a bevel pinion 93 meshing with another bevel pinion 94 on a shaft 95 having journal bearing 96 on the frame 92 near one end thereof and extending at the other end through a block 97 provided with an upright passage 98 through it and constituting part of the frame 92. The shaft 95 is at that side of the frame 92 adjacent to the table 25 at the edge of the latter remote from the passage 26, and at the side of the frame 92 removed from the table 25 there is another shaft 99 parallel with the shaft 95 and provided near one end with a journal bearing 100, while the other end has a journal bearing in the block 97. The two shafts are connected by gear wheels 101 so as to rotate in opposite directions. Where the shafts 95 and 99 traverse the block 97 they have toothed or corrugated portions 102 extending a short distance into opposite sides of the opening or passage 98. Rising from the block 97 are rods or bars 103 arranged in a circular series and constituting a cage upstanding from the block 97 and forming a continuation of the passage 98. This cage and the passage 98 form a receptacle for can heads 104 and a stack of such heads lodged in the receptacle is sustained by the toothed or corrugated portions 102 of the shafts 95 and 99, and the structure is such that when the said shafts are rotated in opposite directions so that the toothed portions 102 where entering the passage 98 move downwardly the can heads are released one at a time to drop from the stack. Underriding the table 25 is a flat turret 105 having a circular series of openings 106 therethrough each of a size to receive a can head 104 and the turret 105 is in turn underridden by a plate 107 in fixed parallel relation to the table 25, so that the turret may turn carrying can heads, one of which is lodged in each passage or opening 106, about its axis of rotation for a purpose to be described.

The plate 107 is provided with a passage 108 at a point about diametrically across the turret 105 from the passage 98 in the frame 92 and this plate is also provided with a passage corresponding to the position of a turret passage 106 just prior to reaching the passage 98, this last named position being indicated at 109.

The table 25 has a passage 110 through it in line with the passages 26 and 98 and at a point substantially midway of these passages, the passage 110 being for a purpose which will presently appear. The turret 105 is carried on the upper end of an upright shaft 111 having journal bearings 112 at an appropriate point on the frame member 2, and this shaft carries a mutilated worm wheel 113 having suitably pitched teeth 114 arranged in groups separated by transverse grooves 115 cutting through corresponding teeth 114ª. In the particular arrangement shown the worm wheel 113 contains forty-two teeth in groups of seven, so that there are six blank spaces 115. Meshing with the worm wheel 113 is a worm pinion 116 also mutilated and having six teeth 117 of suitable pitch and terminal half teeth 117ª so that the group of teeth of the worm pinion represents seven whole teeth corresponding to the groups of seven teeth of the worm wheel 113. The smooth peripheral portion of the worm pinion 116 is provided with a centrally located circumferential flange or rib 118 merging at the ends into the half teeth 117ª and this rib 118 is arranged to travel in the laterally disposed grooves or spaces 115 of the worm wheel 113. The pinion 116 is mounted on the shaft 85 and although the latter rotates continuously the pinion 116 imparts a step by step rotative movement to the wheel 113 to an extent of one-sixth of a revolution for each full revolution of the shaft 85, these proportions being provided for the particular machine under consideration and need not of necessity be adhered to. By this means the shaft 111 moves one-sixth of a revolution for one-third of the revolution of the shaft 85, the teeth 117 extending through an arc of 120°, and during the remainder of the revolution of the shaft 85 the shaft 112 is held stationary by the engagement of the rib 118 in a corresponding groove 115. The result of this is that the turret 105 is given a step by step rotative movement with each step embracing an arc of 60° with an intermediate period of rest long enough to permit certain actions of certain devices which will be described. The shaft 111 also carries a gear wheel 119 in mesh with a pinion 120 which may be of half the diameter of the gear wheel 119 and this pinion 120 is fast upon an upright shaft 121 having journal bearings 122 at appropriate points in the main frame. The shaft 121 rises above the table 25 at a point in line with the passages 26, 98 and 110. Keyed to the upper end of this shaft immediately above the table 25 is a hub 123 from which radiate three arms 124 equidistantly disposed about the hub and each having at the inner end a hinge connection 125 with the hub, so that the outer or free end of each arm may rise and fall about a horizontal axis at the hinge. On the table 25 in concentric relation to the shaft 121 is a circular cam track 126 having a drop portion 127 including about half the circumference of the track. The higher portion of the track and the drop portion are connected by a declivity 128 adjacent the passage 26 in the table 25 and an incline 129 adjacent the passage 110, the arrangement being such that the arms 124 when rotating with the shaft 121 rest upon the cam track 126 and by gravity will follow the contour of the upper face of the track, this constituting the active face. While traveling over the higher portion of the track the arms are raised with respect to the table, and while traveling over the lower portion of the track the arms are in approached relation to the table but still in spaced relation to the top of the table. Each arm has spaced pins 130, one near the outer end of the arm and the other nearer the cam track, with both so arranged as to sweep across the passages 26 and 110 at approximately equal distances on each side of the center of the respective passages. In the top of the table 26 there is produced a pair of spaced parallel grooves 131 conforming to the paths of the pins 130 and extending from the passage 26 to the passage 110, and the knockout ring 47 has matching grooves 132. In concentric relation to the shaft 121 are two guide bars 133 and 134 spaced apart a distance to permit the passage of the paper rings between them, one such ring 135 being indicated midway between the openings 26 and 110. The guide strips 133 and 134 are continued to opposite sides of the passage 110 and have a junction member 136 uniting their ends about the opening 110, this junction member being curved in conformity with the peripheral portion of the opening and through the curved portion 136 of the guide strip are grooves 137 corresponding to the grooves 131 and the spacing of the pins 130.

If it be assumed that the parts are in the position shown in Fig. 5 with a paper ring 135 resting on the knock-out ring 47 and that a rotative movement be imparted to the shaft 121 sufficient to carry an arm 124 across the passage 26 for one-third of a revolution, then the arm 124 which is held so that the lower ends of these pins 130 are higher than the top of the ring 135 then upon the knock-out ring 47, on its progressive movement reaches the declivity 128 and hence drops toward the pad 50 until the pins 130 may engage this pad and immediately afterward pass through the grooves 132 in the knock-out ring 47, engaging the paper ring 135 and as soon as the pins reach the grooves 131 they may drop thereinto until further downward movement of the arm is arrested by the lower cam surface 127. The paper ring is now propelled by the pins 130 engaging it at spaced points and is guided by the strips 133 and 134 until it assumes about the position shown in Fig. 5 at an intermediate point between the openings 26 and 110. On the next impulse given to the shaft 121 to impart one-third of a revolution thereto the ring 135 already considered is carried to the opening 110 and will gravitate into this opening, the pins 130 being lifted out of engagement with the paper ring because the arm 124 is made to ride up the incline 129 until it rests upon the higher portion of the cam 126. By the time the pins 130 disengage from the paper ring 135 the latter has reached a point where it may settle into the opening 110 in which latter there is already deposited a can head 104. In the meantime a second ring 135 has reached about the midpoint of its travel between the openings 26 and 110, so that on the succeeding impulse to the shaft 121 the can head which has already received a paper ring is carried away from the opening 110 and the next can head in order on the turret 105 is brought beneath the opening 110 to receive the next paper ring in order and so the operation continues so long as the machine is running, and the supply of can heads and paper from which rings are cut is maintained.

The can heads with which the machine of this invention is designed to operate are of known construction and are formed with a marginal channel of sufficient width to receive the paper rings which are cut to fit the channel, and these rings may be so proportioned to the channel as to require some little force to seat them therein, thus preventing accidental dislodgement during subsequent operations upon the can heads which are applied to can bodies having terminal flanges designed to in turn seat upon the paper rings while the margins of the can heads are folded or locked on to the flanges of the can body, all this being a customary and well known procedure.

In order to seat the paper rings in the grooves in the can heads the machine of the present invention is provided with two plungers 138 and 139. The plunger 138 is normally seated in the passage 108 of the plate 107 at a point just below the lower face of the turret 105, while the passage 110 in the table 25 is formed with an internal shoulder 140 sufficiently inset toward the center of the opening to be engaged by the margin of a can head 104 when lifted by the plunger 138, which latter is arranged to have an extent of travel sufficient to raise a can head deposited thereon by the turret through the latter and into engagement with the shoulder 140, while the plunger 139 has a sufficient range of travel to descend into the opening 110 until it has pushed the paper ring through the passage formed by the shoulder 140 and into the marginal channel in the can head, it being understood that the plunger 139 is appropriately shaped for this purpose. The two plungers 138 and 139 are timed in operation to perform their functions while the turret is at rest and particularly after the paper ring 135 has been deposited in the passage 110, and, before the next paper ring in order reaches the passage 110, the plunger 139 is withdrawn therefrom while the plunger 138 is withdrawn from the respective passage 106 in the turret 105 before the next rotation is imparted to the turret 105.

To bring the timed operation of the plungers 138 and 139 into effect, the shaft 85 has two cams 141 and 142 mounted thereon. These cams are in the form of disks each with an internal cam groove 143 formed in one face. Entering the cam groove of the cam 141 is a pin or roller 144 carried by one end of a reciprocating rod or piston 145 mounted to slide in a bearing 146 suitably supported in the main frame, and this piston or rod is connected by a link 147 to one end of a rock arm 148 intermediately pivoted on an ear 149 rising from an overhanging bracket 150 above the table 25, said bracket terminating in a bearing 151 for a stem 152 carrying the plunger 139 at its lower end, and the plunger 139 may be connected to the stem 152 by a threaded pin 153 and lock nut 154, so that the plunger 139 may be quite accurately adjusted. The stem 152 terminates at the end remote from the head 139 in a boss 155 carrying at one side a roller 156 mounted on a headed screw 157 tapped in into the boss 155, and this roller in turn engages between the two legs of a fork 158 formed on the end of the arm 148 remote from the link 147 and on the side of the pivot support of this arm remote from said link. When the cam 141 rotates a short cam section 159 of the cam groove 143 causes a movement of the link 147 away from the axis of the shaft 85, this movement occupying but a small fractional portion of the time of rotation of the cam 141, while the remainder of the cam groove is concentric with the axis of the shaft 85, so that the link 147 then remains quiescent. This active movement of the link 147 causes a rocking of the arm 148 in a direction to move the plunger 139 into the opening 110 and immediately withdraw it therefrom.

The plunger 138 is carried by the upper end of a piston or slide 159 mounted in a suitable bearing 160 in an appropriate portion of the main frame and at the lower end the slide 159 is bifurcated, as shown at 161, and there carries a roller 162 engaging in the forked end 163 of a rock lever 164 pivoted between ears 165 carried by the main frame and in the particular instance shown depending from a suitable portion of the main frame. The end of the rock lever 164 remote from the bifurcated end 163 carries a laterally projecting pin or roller 166 engaging in the cam groove 143 of the cam 142, and this cam groove has a cam portion 167 directed toward the shaft 85, so that for a fractional portion of the rotation of the shaft 85 and cam 142 the lever 164 is rocked in a direction to move the plunger 138 toward the shoulder 140 and then retract it, while during the remainder of the revolution of the shaft 85 and cam 142 the plunger 138 remains quiescent in the retracted position.

At the side of the machine remote from the feed roller 18 there is an idler roller 168 mounted on a bracket 169 in position to support the end of the web 24 as it passes from the machine.

While the operation of the machine has been touched upon in the foregoing description, it may be briefly and connectedly repeated. Let it be assumed that there is a web 24 of paper of suitable width and gage and character threaded between the feed roller 18 and the companion idler roller 21 and carried thence over the supporting plates 27 and over the roller 168 to any suitable point of disposal. Let it further be assumed that there is a suitable stack of can heads 104 located in the cage made up of the rods 103 and that the parts are all adjusted and set in motion by power applied to the pulley 7. The driving connection between the main shaft 6 by way of the gears 8 and 9, shaft 10 and gears 13 and 14 to the feed roller 18 imparts rotative movement to the latter in a direction to feed the web 24 through the machine for a distance a little more than the diameter of the rings to be cut, this web passing beneath the die 35 and above the die 44.

As soon as the active portion of the feed roller 18 has passed from engagement with the web 24 the latter tends to move and then the cam 72 becomes active to the rollers 75 and 76 to raise the slide 58 and with it the lower cutting die 44 the knock-out ring 47 then dropping into the lower die 44 until its upper edge is at a distance below the upper edge of the die. The rising movement of the lower die continues until the web 24 is engaged and lifted against the die 35 when a continued upward movement of the die 44 causes the cutting of the ring from the web and the severing of that portion of the web interior to the ring in the form of a disk, which latter is immediately engaged by the pad 50 now rising rapidly into the die 35 at a greater rate of speed of movement than the upward movement of the die 44, this being brought about by the arm 80 actuated by the finger 82 and engaging the head 55 of the pin 51, while moving at a more rapid speed than the slide, the parts being proportioned to cause the pad 50 to lift the waste disk of paper above the catches or lugs 37 when the elasticity of the paper will cause it to first yield and then expand so that it is held by the lugs against falling. The die 44 now drops until again substantially on a level with the top of the table 25 but the knock-out ring 47 has had its lowering movement arrested by the pins 66 and ring 64 engaging the stop screws 63. This projects the knock-out ring 47 for a short distance, say one thirty-second of an inch, above the upper surface of the table 25. In the meantime the stripping ring 38 has forced the web 24 from engagement with the die 35 so that it again falls upon the supporting and guiding plates 27 ready for a second forward feed which occurs after the die 44 has dropped and the web is stripped from the die 35, to be followed by a second actuation of the die 44 and parts carried thereby and the cutting of a second ring, and so on. As soon as the cutting die has dropped to its quiescent position the worm pinion 16 engages and acts upon the worm wheel 113 in a manner to cause it to rotate for a fractional portion of a revolution, this being one-sixth of a revolution in the particular structure shown, and as the turret 105 is carried by the shaft 111 to which the worm wheel 113 is keyed, the turret has imparted to it one-sixth of a revolution. In the meantime, however, the shaft 85 is imparting rotative movement to the feeding shafts or rollers 95 and 99 through the gear wheels 87 and 88, shaft 89, gear wheels 93 and 94, and gear wheel 101 to cause the dropping of a can head into the opening 106 in the turret then beneath the stack of can heads. While the shaft 111 is making a 60° rotation, the gearing connection 119 and 120 with the shaft 121 causes a rotation of the latter through 120° since the gear 119 is twice the diameter of the gear 120 and this movement of the shaft 121 imparts a like movement to the arms 124, thus taking off the paper ring 135 already cut and lodged on the knock-out ring 47 above the plane of the table 25. As the machine progresses in this operation the opening 106 in the turret having the first can head deposited therein is brought under the opening 110 and a corresponding one of the paper rings 135 is brought to the same opening and deposited therein at the same time the can head under consideration reaches said opening, the carrier arm 124 causing the movement of the ring 135 to the opening 110 passing beyond said opening before it stops so as to be out of the way of the plunger 139. The cams 141 and 142 are so disposed that at each rotation of the shaft 85 they cause the quick approach and recession of the plungers 138 and 139, while the rib 118 is in a groove 115 of the worm gear 113 and the turret and track or carrier arms are being held against motion. It is during this time that the cutting die 44 is actuated to sever another paper ring from the paper web and the web is also at this time quiescent. The next active movement of the shaft 111 carries the can head with the paper ring lodged therein from coincidence with the opening 110 and beneath the table 25 and a subsequent movement will carry the said head to the opening 109 through the plate 107 at which point the can head with the paper ring or gasket lodged therein may be discharged from the machine into a suitable receptacle or on to a chute or carrier, whereby the completed head is conveyed away from the machine.

The web 24 after having the rings cut therefrom passes from the machine over the roller 168 to any suitable point of disposal, while the accumulating disks within the cage composed of the bars 31 may be removed from time to time by an attendant as becomes necessary.

The only attention needed for the machine is to replace the web roll 23 from time to time as the web becomes exhausted and to maintain a supply of can heads 104 in the cage composed of the bars 103.

What is claimed is:—

1. In a machine for the purpose described, means for feeding a web of paper, intermittently acting means for cutting rings from the web of paper, means for transporting the rings from the cutting means, a can head carrier movable into intercepting relation to the path of the rings being transported from the cutting means, means for introducing the rings into the can heads, and actuating means for the named parts constructed and timed to actuate the cutting means and the means for introducing the rings into the can heads in alternation with the transporting means and the means for carrying the can heads and also to actuate the paper web during the period of quiescence of the cutting means.

2. In a machine for the purpose described, intermittently acting means for feeding a paper web, intermittently acting means for cutting rings from the web of paper, rotatable means for transporting the rings from the cutting means, a rotatable can head carrier movable into intercepting relation to paper rings transported by the ring transporting means, reciprocatory members for applying the rings to can heads, and driving means for the named parts constructed and timed to reciprocate the cutting means and applying means for the rings and can heads in alternation with the ring transporting and can head carrying means and also to actuate the paper web feeding means during the period of quiescence of the cutting means.

3. In a machine for the purpose described, means for intermittently feeding a paper web, a reciprocating cutting means positioned to cut rings from the paper web, a rotatable carrier for transporting the rings from the cutting means, a rotatable can head carrier having its direction of rotation opposite to that of the ring transporting means and in intercepting relation thereto, reciprocatory plungers in position to apply a paper ring to a can head at the point of interception of the can head carrier and ring transporting means, and actuating means for the named parts constructed to drive them in timed relation.

4. In a machine for the purpose described, means for intermittently propelling a web of paper, means for cutting rings from the web of paper comprising a stationary cutting member, a reciprocatory cutting member movable in and out of operative relation to the stationary cutter to sever the web of paper in spaced concentric lines, and means for propelling the portion of the paper interior to the inner concentric line away from the cutting edges and out of the path of the web of paper, and means associated with the cutting members for transporting the rings as cut wholly away therefrom.

5. In a machine for the purpose described, means for intermittently propelling a web of paper, a stationary cutter in overhanging relation to the web of paper and provided with an exterior stripping means and an interior retaining means, a reciprocatory cutting member underriding the web of paper and movable into and out of engagement with the paper and operative relation to the other cutting member, said second-named cutting member having concentric cutting edges movable into respective embracing and interior relation to the first-named cutting member and also provided with means for lifting the portion of the paper cut from the interior of the ring into position to be held by the engaging members within the first-named cutter and means associated with the cutting members for transporting the rings as cut wholly away therefrom.

6. In a machine for the purpose described, means for feeding paper, a cutter for severing rings from the paper comprising an annular cutting member located on one side of the path of the paper with a yieldable stripper exterior to the cutter, and holding means within the cutter, another cutter on the side of the path of the paper remote from the first-named cutter, said second cutter having cutting means movable to both the exterior and interior of the first-named cutter, a knock-out ring lodged between the inner and outer cutting portions of the second named cutter, means on the second named cutter relatively movable with respect thereto to enter the first named cutter into operative relation to the holding means therein, said cutters having a relative movement to cause the cutting elements of the second named cutter to be in respective embracing and entering relation to the first named cutter with the first named cutter actuating the knock-out ring to the inactive position, and means associated with the cutters for transporting the rings as cut wholly away therefrom.

7. In a machine for the purpose described, a cutter, and means for feeding paper thereacross, said cutter comprising a stationary annular member having a stripping ring exterior thereto and catches interior thereto and arranged in overriding relation to the paper fed thereacross, another cutting member having annular concentric spaced cutting members arranged to receive the first named cutter and movable to and from the latter, a knock-out ring lodged between the cutting members of the second named cutter, a pad carried by the second-named cutter interior to the inner cutting member and having a range of movement independent of the second-named cutter, means for reciprocating the second-named cutter into and out of active relation to the paper and first-named cutter, means for causing the operation of the knock-out ring to retractive position during the cutting operation and to projecting position beyond the cutting edges of the second-named cutter when the latter is retracted, means for imparting to the pad a greater travel from the first-named cutter than the travel of the second-named cutter in the same direction, and means associated with the cutters for transporting the rings as cut wholly away therefrom.

8. In a machine for the purpose described, two opposed coacting annular cutters, one movable toward the other, and said cutters being related to cut a ring, means for reciprocating one of the cutters, a carrying device movable with the reciprocatory cutter into the other cutter, means for imparting to the carrying device a greater extent of travel into the other cutter than that of said reciprocatory cutter, and means associated with the cutters for moving each ring as cut away therefrom.

9. In a machine for the purpose described, coacting annular cutters one being movable toward the other and related thereto to cut a ring, means for reciprocating one of the cutters, a member carried by the reciprocatory cutter and movable into the other cutter, means for imparting to the last-named member a greater extent of travel toward the other cutter than the extent of travel of the cutter carrying it, holding means on the cutter entered by the said member, and means associated with the cutters for removing each ring as cut away therefrom.

10. In a machine for the purpose described, annular cutters related to sever rings from a web of paper introduced between the cutters, means for causing the reciprocation of one cutter toward and from the other, an engaging member on the reciprocatory cutter having a greater range of movement toward the first-named cutter than the movement of the reciprocatory cutter in the same direction, means for causing the accentuated movement of said member comprising a motion multiplying member in the path of and actuated by the means for causing the movement of the reciprocatory cutter and means associated with the cutters for transporting the rings as severed wholly away therefrom.

11. In a machine for the purpose described, means for feeding a web of paper, a stationary annular cutter in overriding relation to the web of paper, said annular cutter having interior holding means or catches, a reciprocatory cutter in underriding relation to the web of paper, and provided with means coacting with the first-named cutter for severing a disk of paper from the web corresponding in diameter to the internal diameter of the first-named cutter, means carried by the second named cutter for engaging the cut out disk of paper, means for imparting to the disk engaging means a movement into the first-named cutter for a distance greater than the like movement of the second-named cutter to propel the cut out disk into engaged relation with the catches, and means associated with the cutters for removing the rings as severed wholly therefrom.

12. In a machine for the purpose described, means for feeding a web of paper, a stationary annular cutter in overriding relation to the web of paper and provided with an exterior stripping ring and interior catches, a reciprocatory cutter in underriding relation to the web of paper and including two annular concentric cutting members movable into shearing relation to the respective outer and inner edges of the first-named cutter, a knock-out ring mounted on the second-named cutter between the cutting edges thereof and movable into projecting or retracting relation with said cutting members, means on a fixed portion of the machine for actuating the knock-out ring to projecting position when the cutter carrying it is retracted, a pad carried by the second named cutter and of a size to enter the first named cutter, said pad having a range of movement independent of the first-named cutter to lift the cut out disk of paper into engaging relation to the catches, means for reciprocating the second named cutter, means actuated by the means for causing the reciprocation of the second named cutter for causing the increased movement of the pad, and means associated with that cutter in underlying relation to the paper web for transporting the paper rings as cut away therefrom.

13. In a machine for the purpose described, means for feeding a web of paper, a stationary annular cutter in overriding relation to the web of paper and provided with an exterior stripping ring and interior catches, a reciprocatory cutter in underriding relation to the web of paper and including two annular concentric cutting members movable into shearing relation to the respective outer and inner edges of the first-named cutter, a knock-out ring mounted on the second-named cutter between the cutting edges thereof and movable into projecting or retracting relation with said cutting members, means on a fixed portion of the machine for actuating the knock-out ring to projecting position when the cutter carrying it is retracted, a pad carried by the second named cutter and of a size to enter the first-named cutter, said pad having a range of movement independently of the first-named cutter to lift the cut out disk of paper into engaging relation to the catches, means for reciprocating the second named cutter, means actuated by the means for causing the reciprocation of the second named cutter for causing the increased movement of the pad, the actuating means for the second named cutter and pad comprising a slide carrying the second named cutter, a cam for reciprocating the slide and the cutter with it, a rock arm in the path of the slide and in position to actuate the pad and having motion multiplying relation to the slide and pad, and means associated with that cutter in underlying relation to the paper web for transporting paper rings as cut away therefrom.

14. In a machine for the purpose described, means for feeding a web of paper, a stationary annular cutter in overriding relation to the web of paper and provided with an exterior stripping ring and interior catches, a reciprocatory cutter in underriding relation to the web of paper and including two annular concentric cutting members movable into shearing relation to the respective outer and inner edges of the first-named cutter, a knock-out ring mounted on the second-named cutter between the cutting edges thereof and movable into projecting or retracting relation with said cutting members, means on a fixed portion of the machine for actuating the knock-out ring to projecting position when the cutter carrying it is retracted, a pad carried by the second named cutter and of a size to enter the first named cutter, said pad having a range of movement independent of the first named cutter to lift the cut out disk of paper into engaging relation to the catches, means for reciprocating the second named cutter, and means actuated by the means for causing the reciprocation of the second named cutter for causing the increased movement of the pad, the actuating means for the second named cutter and pad comprising a slide carrying the second named cutter, a cam for reciprocating the slide and the cutter with it, a rock arm in the path of the slide and in position to actuate the pad, and having motion multiplying relation to the slide and pad, said pad being provided with a stem or rod having a spring for retaining it in the retracted position, and the motion multiplying means acting on the stem in opposition to the spring, and means associated with that cutter in underlying relation to the paper web for transporting the paper rings as cut away therefrom.

15. In a machine for the purpose described, means for feeding a web of paper, a cutter constructed to sever rings from the web of paper and comprising a fixed and a reciprocatory member, a slide carrying the reciprocatory member, a plate mounted on the slide for adjustment longitudinally thereof, a cam for imparting reciprocation to the slide, rollers carried by the plate for engagement with the cam, and means associated with the cutter and timed in operation to transport the paper rings as severed away from the cutter on the withdrawal of the reciprocatory member from the fixed member.

16. In a machine for the purpose described, means for feeding a web of paper, a cutter constructed to sever rings from the web of paper and having a reciprocatory member, a slide carrying the reciprocatory member, a cam for imparting reciprocation to the slide, a plate on the slide mounted thereon for adjustment longitudinally of the slide, rollers carried by the plate for engagement with the cam, the cutting member carried by the slide having an interior member for engaging disks cut from the interior of the rings and having a greater range of active travel than the slide, means for causing said greater range of active travel comprising a pivoted member mounted on a fixed portion of the machine and movable into engagement with the disk engaging member, a member mounted on the slide in position to engage the pivoted member and impart an increased rate of movement thereto over the rate of movement of the slide, and means associated with the reciprocatory member and timed in operation with respect thereto to transport the rings as severed away therefrom.

17. In a machine for the purpose described, means for the production of paper rings, and means for transporting the paper rings away from the producing means comprising a rotatable series of arms each pivoted to move toward and from the paper rings and each provided at points distant from the pivots with spaced pins directed toward the path of the paper rings, and means constructed to direct the arms during a portion of the rotative movement to bring the spaced pins within the inner circumference of the respective paper rings.

18. In a machine for the purpose described, means for the production of paper rings, and means for the movement of the paper rings from the point of production to a point of disposal comprising a rotatable series of arms each provided at points distant from the axis of rotation with spaced pins closer together than the internal diameter of the rings, an elongated support for the rings over which they may travel, and having therein spaced grooves for receiving the pins, said grooves being curved about the axis of rotation of the arms, and means for moving the arms in succession to bring the pins within respective rings at the point of production and move the rings along the support to the point of disposal and there move the arms out of engagement with the rings.

19. In a machine for the purpose described, means for producing paper rings, means for the disposal of the paper rings at a distance from the point of production, a support for the paper rings extending from the point of production to the point of disposal, a series of arms movable over the support from the point of production of rings to the point of disposal, and means for moving said arms toward the support at the point of production of the rings and from the support at the point of disposal thereof, each arm having means projecting therefrom toward the support to engage within a ring, and the support being recessed for the reception of the projecting means on the arms and conforming to the path of movement of the ring engaging projecting means of the arms from the point of production to the point of disposal of the rings.

20. In a machine for the purpose described, means for the production of paper rings, means for the disposal of the paper rings at a distance from the point of production, a support for the paper rings between the points of production and disposal, a series of arms movable in succession over the support and each provided with spaced pins separated a distance less than the internal diameter of the rings to enter the rings, the support having grooves for the reception of the spaced pins and conforming to the paths of the pins over the support, and means for moving the arms toward and from the support to engage respective rings at the point of production and release them at the point of disposal.

21. In a machine for the purpose described, means for the production of paper rings, means for the disposal of paper rings spaced from the point of production thereof, a ring supporting table extending between the point of production and point of disposal, a shaft mounted intermediate of the point of production and point of disposal and provided with pivoted arms of a length to sweep over the rings at the point of production and to move the rings over the table to the point of disposal, the arms moving about the axis of the shaft and said arms being pivotally connected to the shaft for movement on axes parallel with the table, curved guides for the rings disposed on the table between the point of production of the rings and the point of disposal thereof in concentric relation to the shaft, the table being also provided with spaced grooves between the guides and concentric therewith and reaching from the point of production to the point of disposal of the rings, and a cam member acting on the arms to elevate them above the level of the rings during a portion of the rotation and to permit them to move toward the table into engagement with the rings while sweeping over the part of the table occupied by the guides, said arms being provided with projecting pins adapted to the grooves disposed to engage a ring at the inner forward edge thereof in the direction of travel.

22. In a machine for the purpose described, a table having spaced passages therethrough, a shaft extending through the table at a point intermediate of the passages, arms pivoted to the shaft to move toward and from the table and of a length to sweep over the passages and the intervening space about the axis of the shaft, the table being provided with grooves joining the passages through the table and concentric with the axis of the shaft, and the arms having pins adapted to enter the grooves, a cam member concentric with the shaft and shaped to lift the arms away from the table during a portion of the rotative movement and to permit them to approach the table so that the pins will enter the grooves while the arms sweep over the grooved portion of the table, guide members concentric with the axis of the shaft and on opposite sides of the grooved portion of the table and reaching from one passage through the table to the other, means at one of the passages for producing rings, of a size to move over the table between the guides, and means at the other passage for disposing of the rings.

23. In a machine for the purpose described, means for the production of paper rings, means for transporting the rings from the point of production to a point of disposal, means for delivering can heads to the point of disposal of the rings to receive the rings, comprising a rotatable turret in the form of a perforated plate with the perforations or passages of a size to each receive a can head, an underriding member forming a closure for the passages through the perforated plate, means for depositing can heads one at a time in order in the passages through the perforated plate, and means for seating a deposited ring into a can head receiving the same and located in operative relation to the perforated plate at the point of disposal of the rings.

24. In a machine for the purpose described, a table having a passage therethrough, a rotatable turret in the form of a plate having a circular series of passages therethrough movable one at a time beneath the passage through the table, a member in underriding relation to the turret and forming a closure for the passages through the turret, means for depositing can heads one at a time in order in said passages, means related to the table for forming paper rings, and means for transporting the paper rings from the point of formation to the perforation in the table in timed relation to the movement of the turret to deposit the rings one at a time upon the can heads.

25. In a machine for the purpose described, a table having a passage therethrough, a rotatable turret in the form of a plate having a circular series of passages therethrough movable one at a time beneath the passage through the table, a member in underriding relation to the turret and forming a closure for the passages through the turret, means for depositing can heads one at a time in order in said passages, means related to the table for forming paper rings, and means for transporting the paper rings from the point of formation to the passage in the table in timed relation to the movement of the turret to deposit the rings one at a time upon the can heads, the machine being also provided with coacting means for seating a deposited ring in a can head and located and timed in operation to engage the can head and ring while lodged in the passage of the turret when coincident with the passage through the table.

26. In a machine for the purpose described, a carrier for a stack of can heads, a continuously movable member for releasing the can heads one at a time to the action of gravity, an intermittently movable turret having means for receiving the can heads one at a time and movable in timed relation to the dropping of the can heads, means for the production of paper rings, intermittently movable means for transporting the paper rings one at a time and depositing them upon the can heads, and means for seating the rings in the can heads and timed to act during the period of quiescence of the turret and the transporting means.

27. In a machine for the purpose described, a rotatable turret having a circular series of means for receiving and carrying can heads, means for producing paper rings, means for transporting the paper rings from the point of production to the turret and depositing the rings on can heads carried by the turret, means for imparting a step by step rotative movement to the turret, gearing connections between the turret actuating means and the means for transporting the paper rings timed to impart a step by step movement thereto, an intermittently acting means for seating the rings in the can heads when deposited thereon, and operating means for the seating means timed to cause the actuation thereof during the period of rest of both the turret and the ring transporting means.

28. In a machine for the purpose described, a continuously rotatable drive shaft, a cutter for producing rings from a paper web, intermittently acting connections between the drive shaft and the cutter for causing the operation of the latter, intermittently acting means for propelling the web in operative relation to the cutter, a rotatable turret for receiving can heads, means connected to the drive shaft for imparting intermittent progressive rotation to the turret, means for transporting the rings severed by the cutter to and depositing them on the can heads in the turret, connections between the intermittent drive means for the turret and the transporting means to impart timed intermittent progressive rotation to the transporting means, plungers associated with the turret and transporting means to seat a paper ring in a can head after deposition thereon, and drive means for the plungers connected to the drive shafts for actuation thereby comprising oppositely movable rock arms, and simultaneously acting cams actuated by the drive shaft and acting on the rock arms to move the plungers simultaneously in opposite directions in timed relation to the movements of the other parts.

29. In a machine for the purpose described, means for cutting paper rings, means for seating the paper rings in can heads comprising a shouldered passage for receiving a can head on one side of the shoulder, and a paper ring on the other side of the shoulder and oppositely movable plungers adapted to the passage to actuate the can head against the shoulder and simultaneously force the paper ring deposited on the can head into seating relation thereto, and means for transporting the paper rings as cut from the cutting means to the seating means in timed relation to the operation of the plungers.

In testimony, that we claim the foregoing as our own, we have hereto affixed our signatures in the presence of two witnesses.

EDWARD N. MROZINSKI.
CLYDE L. HUNSICKER.

Witnesses:
THOMAS TIPPETT,
G. E. KRAUL.